(12) United States Patent
Critchlow et al.

(10) Patent No.: US 6,401,060 B1
(45) Date of Patent: Jun. 4, 2002

(54) METHOD FOR TYPOGRAPHICAL DETECTION AND REPLACEMENT IN JAPANESE TEXT

(75) Inventors: Richard Lee Critchlow, Seattle; Patrick H. Halstead, Bellevue, both of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/104,699

(22) Filed: Jun. 25, 1998

(51) Int. Cl.[7] .............................................. G06F 17/20
(52) U.S. Cl. ........................................ 704/1; 707/533
(58) Field of Search .................. 704/1, 9, 10; 707/530, 707/531, 532, 533, 535, 536, 540

(56) References Cited

U.S. PATENT DOCUMENTS

| | | | |
|---|---|---|---|
| 5,258,909 A | * 11/1993 | Damerau et al. ............... | 704/9 |
| 5,321,801 A | 6/1994 | Ando | |
| 5,535,119 A | 7/1996 | Ito et al. | |
| 5,572,423 A | * 11/1996 | Church ....................... | 707/533 |
| 5,634,066 A | 5/1997 | Takehara et al. | |
| 5,634,134 A | 5/1997 | Kumai et al. | |
| 5,659,771 A | * 8/1997 | Gloding ....................... | 707/533 |
| 5,715,469 A | * 2/1998 | Arning ......................... | 704/10 |
| 5,794,177 A | * 8/1998 | Carus et al. .................... | 704/9 |
| 5,799,269 A | * 8/1998 | Schabes et al. ................ | 704/9 |
| 5,946,648 A | * 8/1999 | Halstead, Jr. et al. ............ | 704/9 |
| 6,035,269 A | * 3/2000 | Kim .............................. | 704/9 |
| 6,047,300 A | * 4/2000 | Walfish et al. ................ | 707/533 |
| 6,131,102 A1 | * 10/2001 | Potter .......................... | 707/533 |

OTHER PUBLICATIONS

Cormen et al., "Dynamic Programming," Chapter 16, Introduction to Algorithms, The MIT Press, Cambridge, MA, ©1990 by The Massachusetts Institute of Technology, pp. 301–312.

* cited by examiner

*Primary Examiner*—Patrick N. Edouard
(74) *Attorney, Agent, or Firm*—Joseph R. Kelly; Westman, Champlin & Kelly, P.A.

(57) ABSTRACT

Detecting typographical errors in a Japanese sentence by using a bottom-up approach analysis. The bottom-up analysis employs probabilities, dictionaries and heuristics to words that are found in morpho-lexical information derived from the Japanese sentence. This bottom-up approach combines valid phrases analyses into well-formed combined phrases, i.e., phrase lists, to determine the existence of "holes". Holes are characters contained in the input sentence but not in the well-formed phrase lists. Probabilities are used to determine which phrase list is most representative of the input sentence. The hole contained in the phrase list having the lowest cost (highest probability) is analyzed to determine if it is a typographical error. This analysis includes checking the hole to determine if it is an extended dictionary and whether it is a proper noun. The hole may be "relaxed" by adding contiguous characters and rechecking the "relaxed" hole in the extended dictionary to determine if it is a proper noun. If the hole represents a typographical error, a replacement string is generated using reverse transformations to counteract the text entry error which created the typographical error. A dictionary is used in the replacement string generation process to determine the valid phrases.

22 Claims, 8 Drawing Sheets

Input Text:
405 − あすたの会議の打ち合わせをする。

Step 1:
Character Edge Probability Scores:
410 − あ す た の*会-議*の 打 ち 合 わ せ を す る*。
415 − 12/19/27/a6/14/24/78/04/1f/11/5b/8a/d8/21/ff/02 001

Note: special characters appearing between characters in 410 designate special heuristic information encoded in the lexicon.
- a) The * character (asterisk) signifies an inter-word break hint.
- b) The − character (dash) signifies that this edge is a known intra-word edge.
- c) The lack of any character (せ を す) signifies no break hints.
- d) The space character signifies no information.

Step 2:
Order Edges for Phrase Analysis

| Right Character | Left Character | Probability Score (in hex) |
|---|---|---|
| EOS[1] | 。 | 00 |
| 。 | る | 02 |
| 打 | の | 04 |
| 合 | ち | 11 |
| 会 | の | 14 |
| ... | ... | ... |

420

Step 3:
Order Phrase Analyses by Associated Cost

430

| Phrase analysis | Category | Associated Cost (in hex) |
|---|---|---|
| す-る | LNONE (irregular stem) | EE |
| 打-ち-合-わ-せ.を | VN2 (verbal noun #2) | DE |
| 会-議.の | Noun | F6 |
| 。 | Sym (symbol) | F9 |
| ... | ... | ... |
| あすたの | XXX | 7FC |

425

435

Note: special characters appearing between characters in column 425 designate special phrase breaking information. The − character (dash) signifies and intra-morpheme edge. The character (period) signifies an inter-morpheme edge.

METHOD FOR TYPOGRAPHICAL DETECTION AND REPLACEMENT IN JAPANESE TEXT

TECHNICAL FIELD

The present invention relates to word processing systems, and more particularly relates to detecting typographical errors and generating replacement strings in documents that contain Japanese text.

BACKGROUND OF THE INVENTION

Typographical (spelling) checkers, style checkers, and grammar checkers are common in modem word processing programs. The Japanese language presents interesting problems in this area because of several characteristics of the written language. First, the Japanese language employs several different alphabets, which may be used in combination. Second, Japanese text is typically written without any spaces between words. Third, the Japanese language has a highly productive morphology, which means Japanese words can undergo significant spelling changes to indicate case, tense, politeness, aspect, mood, or voice, etc.

The most commonly used Japanese alphabets (or writing systems) are Kanji, Hiragana, and Katakana. The Kanji alphabet includes pictographs or ideographic characters that were adopted from the Chinese alphabet. Hiragana and Katakana are phonetic alphabets that do not include any characters common to each other or to Kanji. Hiragana is used to spell words of Japanese origin. Katakana is used to spell words of foreign (primarily western) origin. Kanji pictographs are analogous to shorthand variants of Hiragana words in that any Kanji word can be written in Hiragana, though the converse is not true. A single Japanese word can include characters from more than one alphabet.

One of the functions performed by typographical checkers is to detect malformed phrases, or words, and suggest replacement text strings. The types of malformed words detected by typographical checkers include (using the example of "hello"): 1) transposed characters (e.g., "helol"; 2) Missing characters (e.g., "hllo"); 3) duplicate characters (e.g., "heello"); 4) extra characters (e.g., "hepllo") and 5) a wrong character (e.g., "hwllo"). One approach to performing typographical checking for the Japanese language is to use a dictionary look-up. This approach looks up every word or stem in the document and compares it against a Japanese dictionary to determine if it is valid. However, over-flagging of some words and under-flagging of typographical errors can occur due to the large number of characters in the Japanese language and non-delimited nature of Japanese text.

Another approach to typographical checking uses a heuristic pattern-match. In this approach, rules are used to identify frequent typographical mistakes. In this approach, though, there is often under-flagging of typographical errors because these errors cannot be easily classified into groups when written in the Japanese language.

Yet another approach to typographical checking uses a statistical likelihood of occurrence. This approach uses a large trained corpus of text to compute a probability of whether any given string of characters is well-formed. This approach suffers from requiring a significant investment in training corpora which often contain typographical errors themselves. In addition, because there are an infinite number of sentences in the Japanese language, it is very difficult to robustly model well-formed strings using this approach.

Therefore, there is a need in the art for an improved method for identifying typographical errors in Japanese text and generating replacement strings for malformed text. An acceptable Japanese language solution should be small enough (in terms of memory requirements) and fast enough to perform satisfactorily in a desktop computer environment.

SUMMARY OF THE INVENTION

The present invention satisfies the above-described needs by providing an improved method for detecting typographical errors and generating replacement strings in documents containing Japanese text. The present invention employs a bottom-up approach utilizing a dictionary, heuristics and probability analysis to determine whether a typographical error exists and then utilizes heuristics, finite-state morphology and a dictionary to generate a replacement string.

Generally described, the present invention parses a Japanese sentence using morpho-lexical analysis. The result of the morpho-lexical analysis is a list of valid phrases that are contained in the Japanese sentence and a cost associated with each phrase. The phrase corresponds to the standard phonological unit, called bunsetsu, taught in Japanese schools. The present invention operationally defines a phrase as one or more dictionary words (in their stem or non-conjugated form) prefixed and/or postfixed with zero or more morphemes. Since the phrase is constructed from morphemes and dictionary words (lexical entries), the analysis is described as morpho-lexical in nature. The cost associated with each phrase is derived from the probability that each word and morpheme making it up, and the combination thereof, constitute the intended analysis of the corresponding set of characters in the input sentence. The present invention receives the valid phrases and their associated costs from the morpho-lexical analysis. The valid phrases are then combined in such a way as to create all possible non-overlapping sets of phrases in efforts to find one such set that represents the entire string of characters in the input sentence. For simplicity, these sets of non-overlapping phrases are referred to as phrase lists. When the phrases are combined, their respective costs are also combined, resulting in a summed associated cost for the phrase list. If any phrase list spans the input sentence, i.e., the phrase list exactly duplicates the input sentence, no typographical error exists and processing ceases.

If no spanning phrase list exists, then the phrase list containing the lowest combined associated cost, i.e., the phrase list having the combined associated cost signifying that it is most representative of the input sentence, is selected. Using the selected phrase list, any "holes" are determined. A hole is a character, or set of characters, that are found in the input sentence but not in the selected phrase lists. In other words, the hole is a character or set of characters where the selected phrase list does not span the input sentence corresponding to a gap in the analysis. The hole is where any typographical error exists, if any, within the input sentence. For one aspect of the present invention, the hole is checked to determine if any part of it can be analyzed, using morpho-lexical process, as a valid phrase when an extended dictionary is enabled. In addition, rules are applied to determine if any part of the hole can be analyzed, using morpho-lexical process, as a valid phrase when an extended dictionary is enabled. In addition, rules are applied to determine if any part of the hole can be analyzed as a proper noun. The hole may be "relaxed" by adding contiguous characters next to the hole from the input sentence and rechecking the "relaxed", hole in the same way as above, i.e., by enabling an extended dictionary and performing a secondary morpho-lexical analysis and by applying a set of proper noun rules.

A replacement string is then generated for the hole. The replacement string is generated using heuristics (rules) intended to counteract the process by which the error was created. The rules match patterns associated with certain types of errors and make appropriate changes to correct those errors, associating a cost with each correction. The replacement candidates thus generated then undergo morpho-lexical analysis and are ranked according to the combination of their associated costs. All candidates which score better than a certain threshold value, i.e., have a lower cost, are presented to the user as potential replacements.

The advantage of the bottom-up approach applied by the present invention for identifying typographical errors is that it greatly reduces the number of searching tasks, and consequently processing, required to find a typographical error. This reduced processing thereby increases performance and efficiency of typographical error checking completed within a desktop computing environment. By increasing performance, more analysis can be done in the same time it takes slower systems, thus resulting in an overall increase in precision. Another advantage of the present invention is that it increases the reliability of the typographical error checking. By reconstructing the input sentence through the use of well-formed words, the bottom-up approach decreases any overflagging errors that may be present in the morpho-lexical analysis. Another advantage of the present invention is that it reduces the over analysis of sentences by rare words. By using a two-pass algorithm in which a primary dictionary of higher frequency words is used to do morpho-lexical analysis first, and then followed by morpho-lexical analysis of holes using an extended dictionary, this approach reduces the errors caused by low frequency or rare words existing in the extended dictionary, yet still allows them to be incorporated into the error-detection process.

These and other aspects of the present invention may be more clearly understood and appreciated from a review of the following detailed description of the disclosed embodiments and by reference to the appended drawings and claims.

DETAILED DESCRIPTION

The present invention is directed toward a method for detecting typographical errors and generating replacement strings in documents containing Japanese text. In one embodiment, the present invention is incorporated into a software application bundled together with other applications and entitled "OFFICE 2000", marketed by Microsoft Corporation of Redmond, Wash. Briefly described, the "OFFICE 2000" suite allows users access to multiple applications, including a word processing application, and provides for a clean and consistent interface between the applications.

A bottom-up approach is used by the present invention to analyze a Japanese sentence and to determine if a typographical error exists. Morpho-lexical analysis is performed on the Japanese sentence, resulting in a list of valid phrases that are contained in the Japanese sentence and a cost associated with each phrase. The valid phrases are combined, along with the associated costs, in an effort to completely analyze the characters in the input sentence. In the event the input sentence cannot be completely analyzed using the combination of valid phrases, then each remaining "hole" in the sentence which is not represented by any phrase is analyzed to determine if a typographical error exists. If a typographical error exists, then a replacement string is generated using heuristic rules and the analysis component. The rules match patterns associated with certain errors and alter the text to eliminate those errors. The strings generated in this way are then re-analyzed and ranked according to their probabilities and the costs associated with the rules. The candidate replacement string with the best score is presented to the user as a suggested replacement.

EXEMPLARY OPERATING ENVIRONMENT

Figure 1:
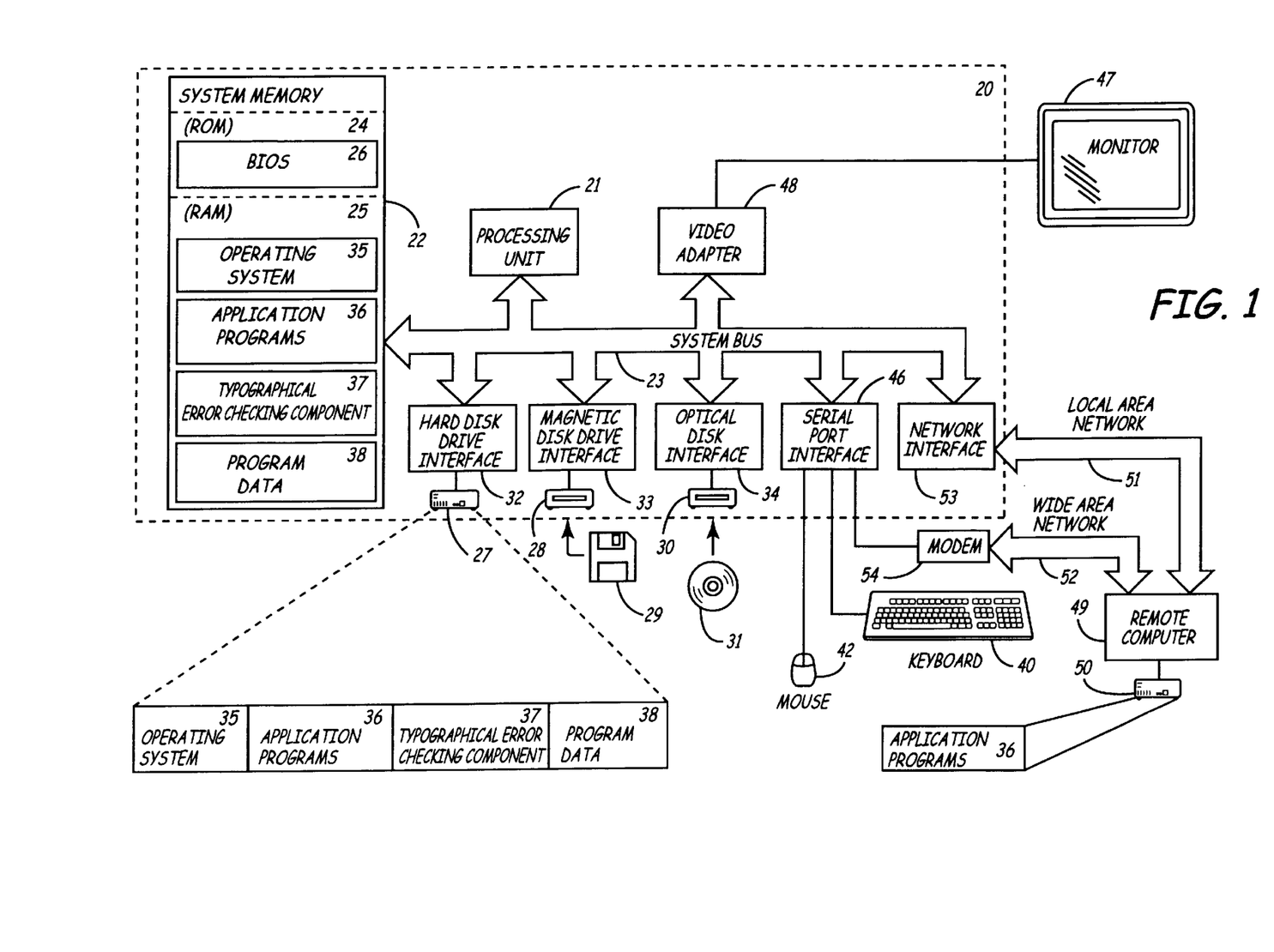
FIG. 1 is a block diagram of a personal computer that provides the operating environment for an exemplary embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, such as a word processing program, other program modules 37, such as a typographical error checking component, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

DETECTING TYPOGRAPHICAL ERROS AND GENERATING REPLACEMRNT TEXT STRINGS

The present invention provides an improved method for generating replacement strings for malformed Japanese text. Generally described, the present invention analyzes morpho-lexical information derived from the Japanese text and determines whether a typographical error exists. Types of typographical errors include (using the example of "hello"): 1) transposed characters (e.g., "helol"; 2) missing characters (e.g., "hllo"); 3) duplicate characters (e.g., "heello"); 4) extra characters (e.g., "hepllo") and 5) a wrong character (e.g., "hwllo"). If a typographical error exists, a replacement string is generated by applying heuristics and finite-morphology to the Japanese text that contains the typographical error. Text is divided into valid morphemes and words (i.e., known Japanese words). The words and morphemes are then combined in a deterministic way to form phrases, where a phrase is any combination of one or more words (in dictionary-stem form) surrounded by zero or more bound morphemes. The phrases are subsequently combined into phrase lists. The purpose of this combination is to attempt to find an analysis which completely spans the entire input sentence, i.e., one set of non-overlapping phrases which when linked together represent all and only those characters in the input sentence. If this attempt fails, i.e., no phrase list is found that spans the text, then the phrase list with the lowest associated cost is chosen and each part of the text that is not covered by this chosen phrase is labeled as a "hole". Then, each of these "holes" are analyzed and for each that is determined to contain a typographical error, a replacement string is generated.

Figure 2:
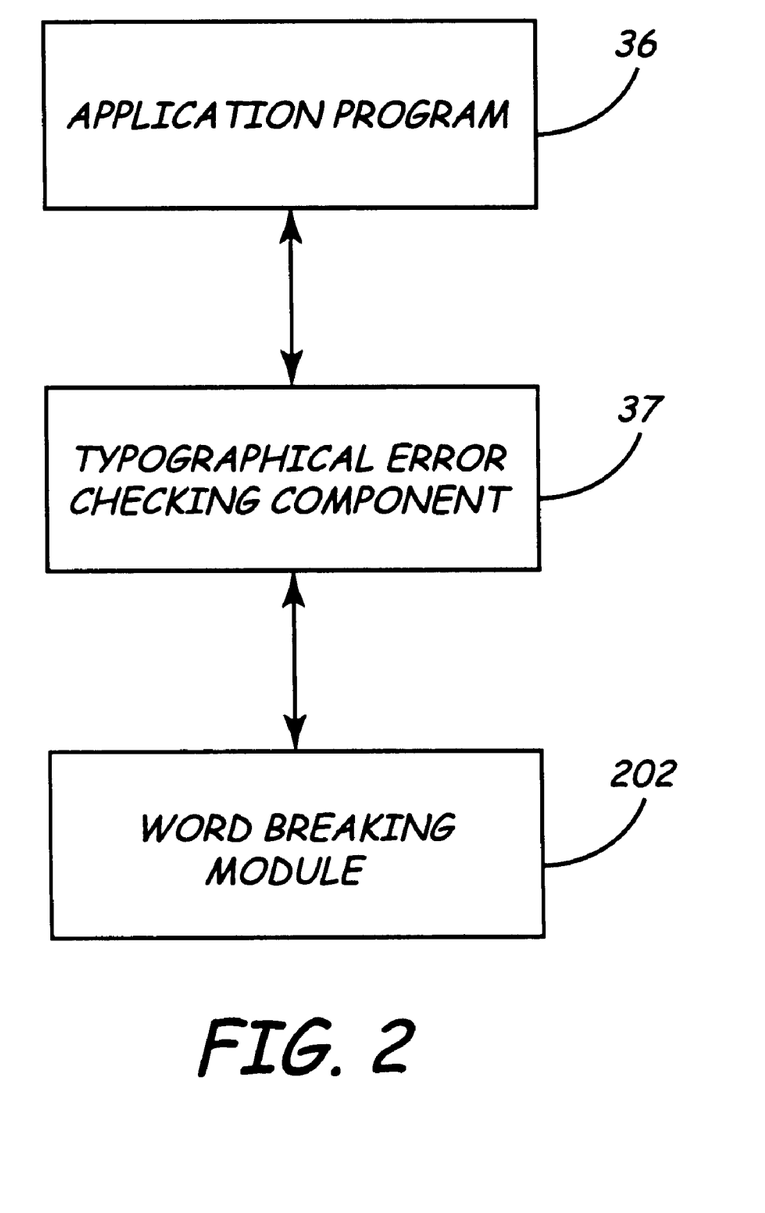
FIG. 2 is a block diagram illustrating the interaction between the major program modules employed in an exemplary embodiment of the present invention.
Figure 3:
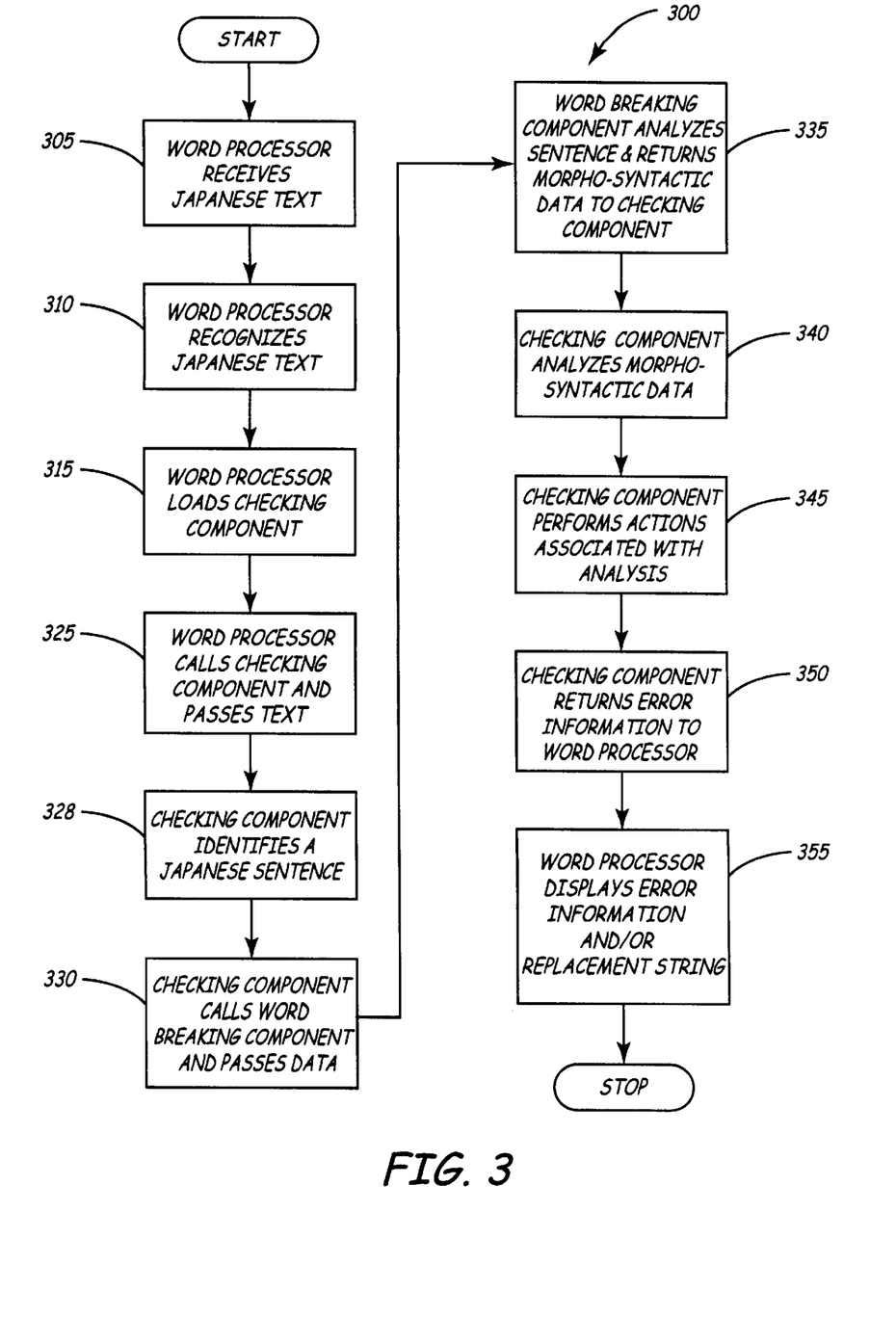
FIG. 3 is a flow diagram illustrating the functions completed by the program modules of FIG. 2.
Figure 4:
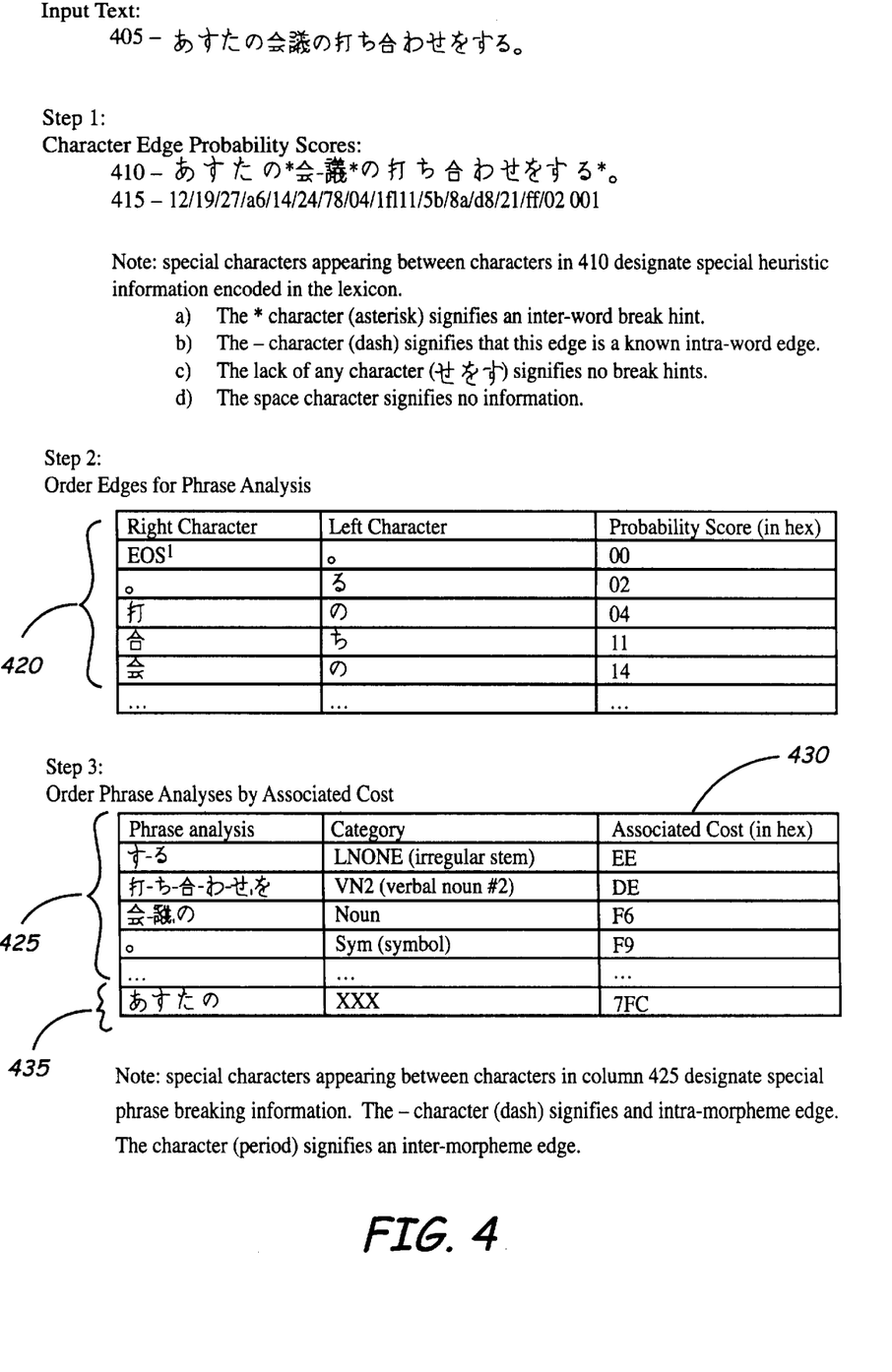
FIG. 4 is a pictorial representation of steps involved in breaking a Japanese sentence into phrases in accordance with an exemplary embodiment of the present invention.
Figure 5:
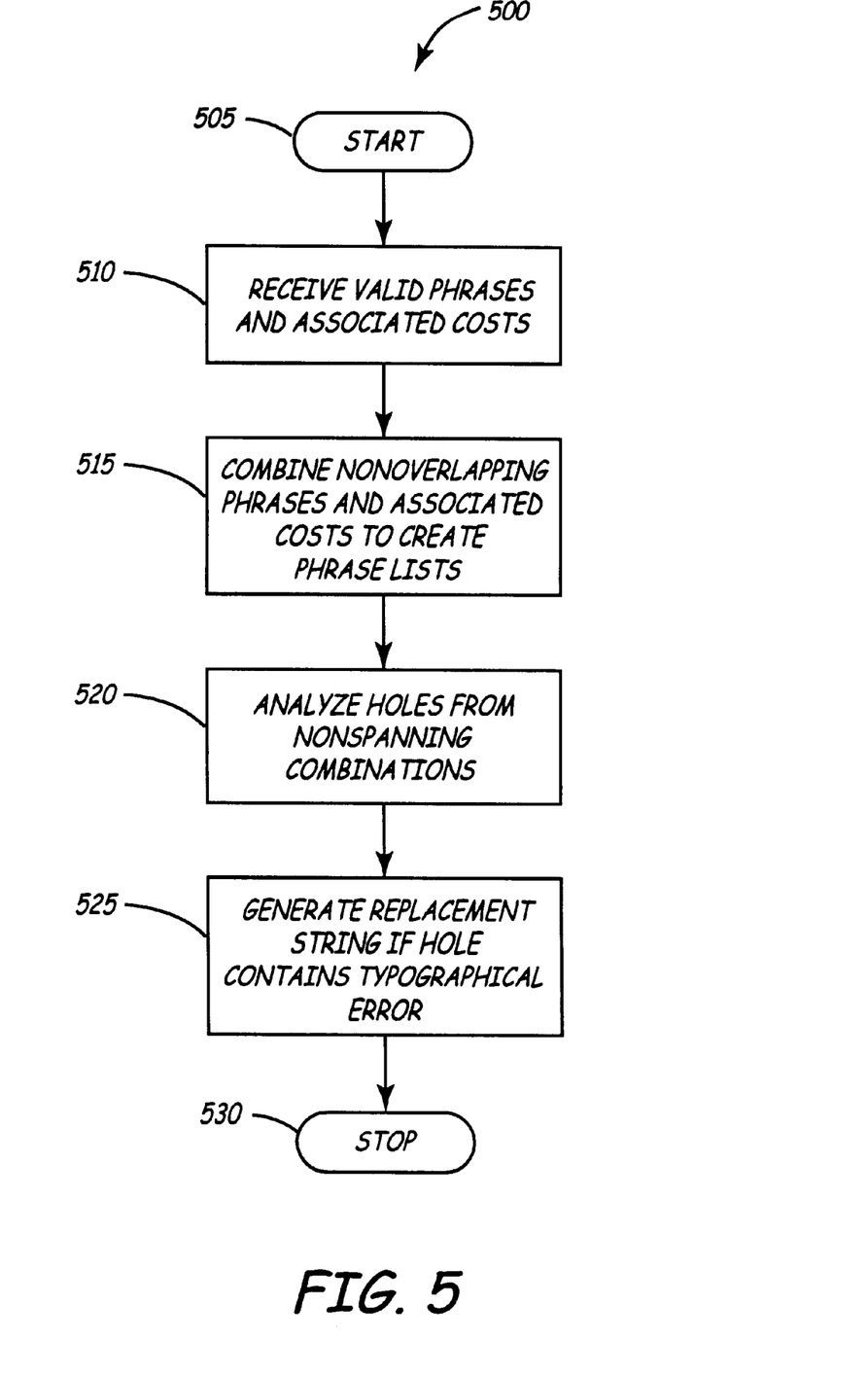
FIG. 5 is a flowchart providing a general methods overview of the steps involved in performing Typographical Detection and Replacement Methods in accordance with an exemplary embodiment of the present invention.
Figure 6:
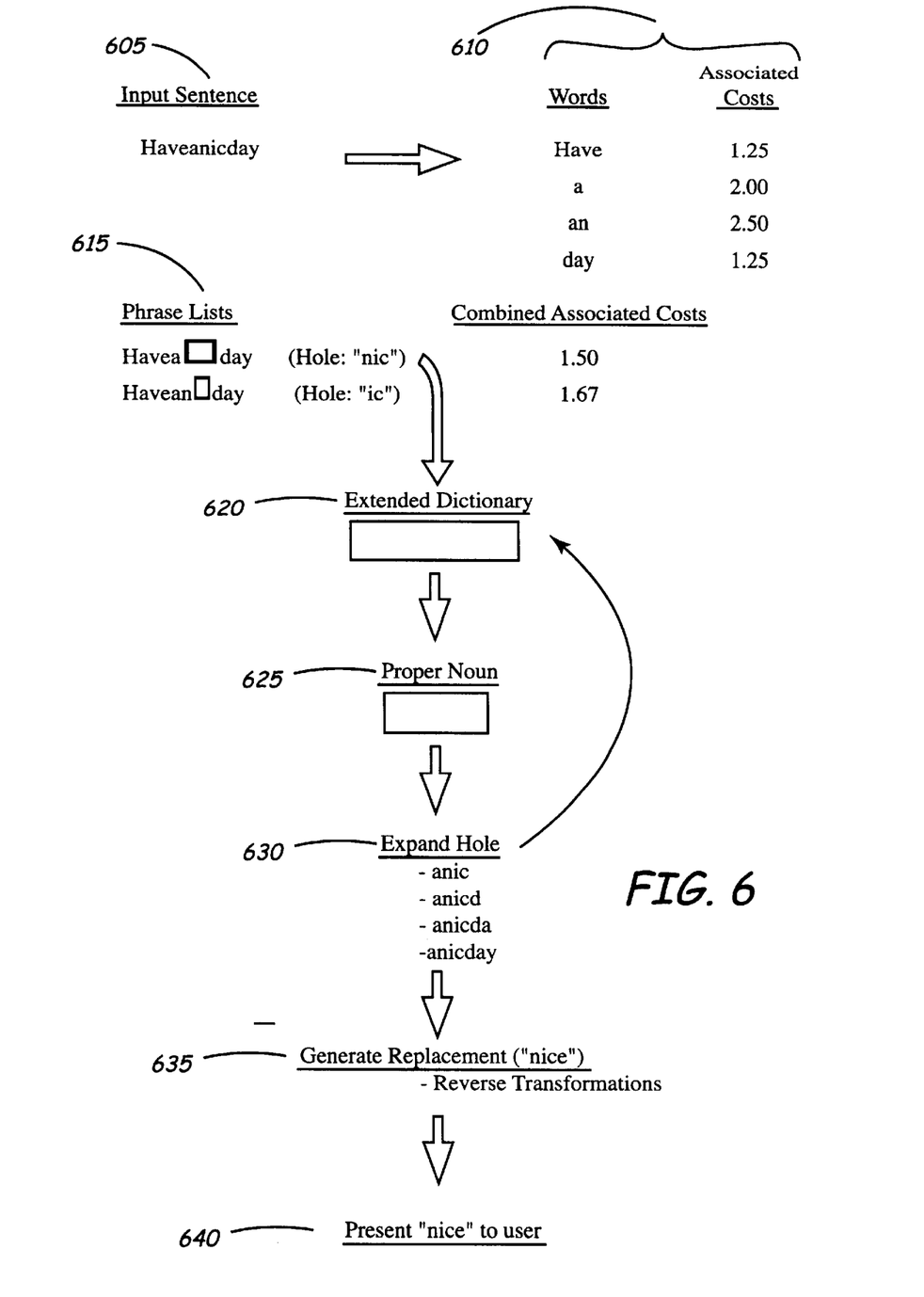
FIG. 6 is a pictorial representation of the steps involved in performing Typographical Detection and Replacement methods in accordance with an exemplary embodiment of the present invention.
Figure 7:
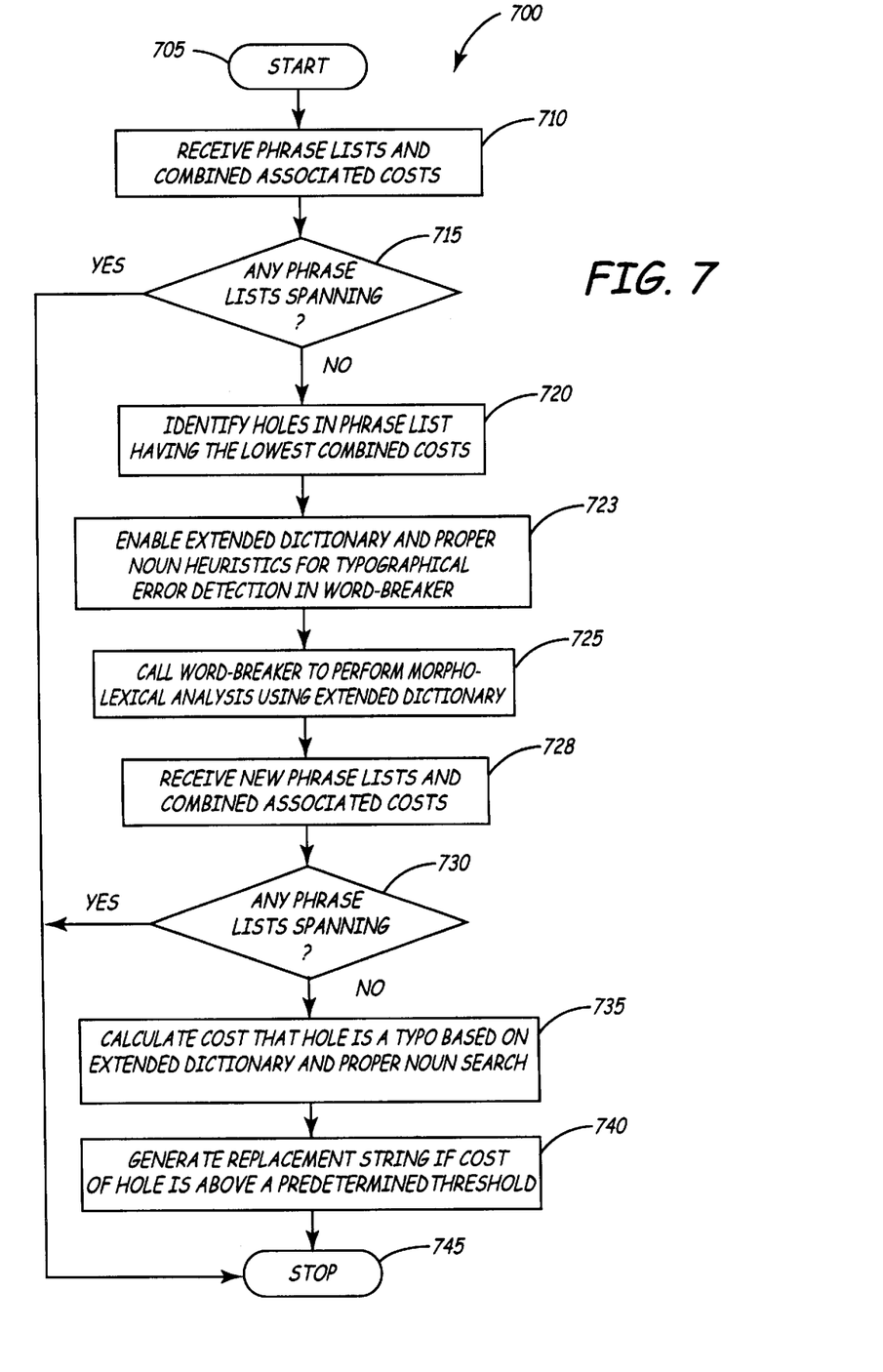
FIG. 7 is a flowchart depicting a Typographical Detection method in accordance with an exemplary embodiment of the present invention.
Figure 8:
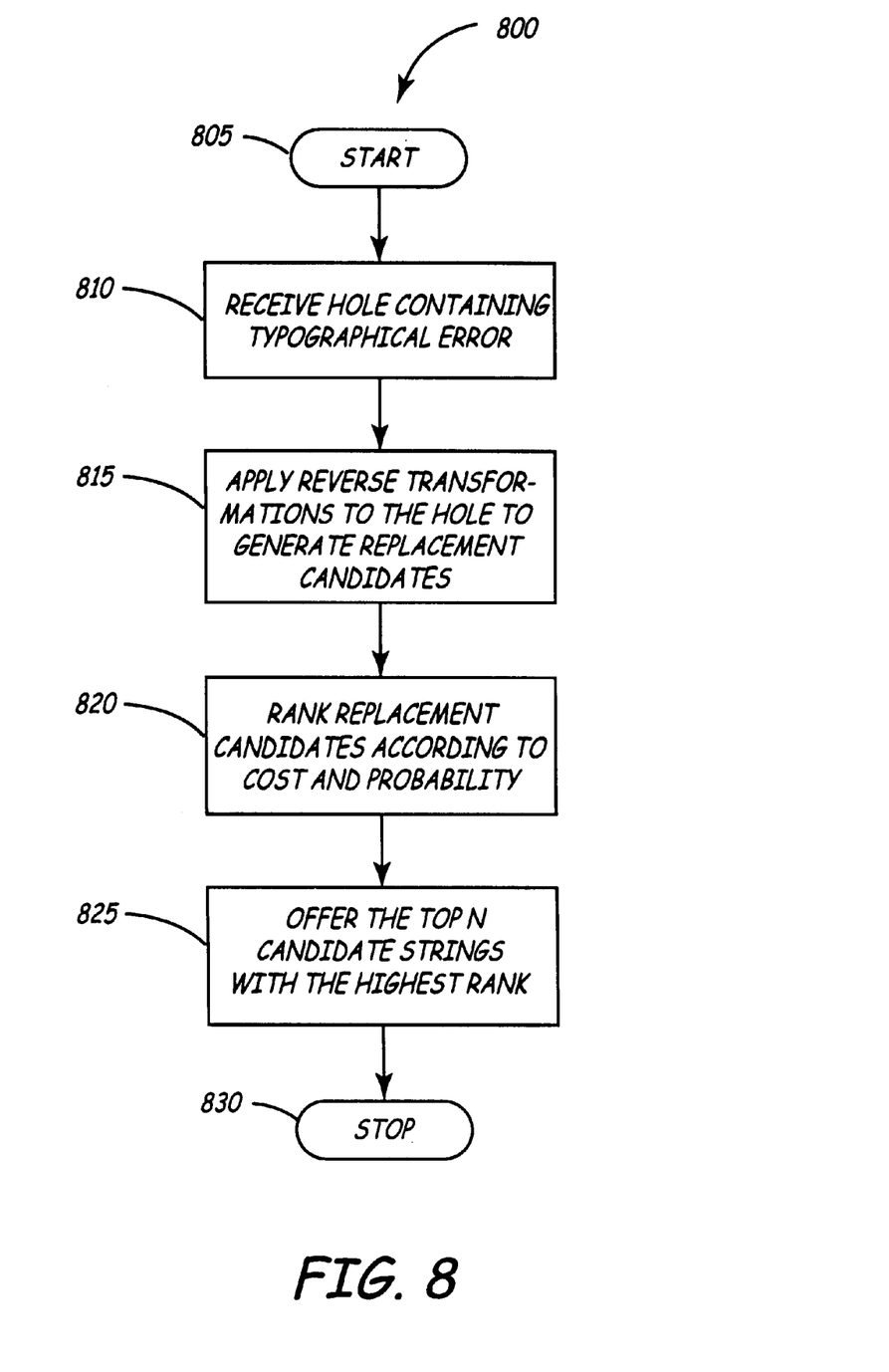
FIG. 8 is a flowchart depicting a Replacement method in accordance with an exemplary embodiment of the present invention.

Exemplary embodiments of the present invention will be described in connection with the appended set of drawings. FIG. 1 illustrates a typical operating environment of an exemplary embodiment, and shows a typographical checker implemented in conjunction with a word processing program. FIGS. 2 and 3 illustrate the primary program modules of an exemplary embodiment and describe the interaction between the program modules. FIG. 4 provides an example of a Japanese sentence and morpho-lexical data that results from a morpho-lexical analysis of that sentence, which breaks the sentence into constituent valid phrases and associates a cost with each valid phrase. FIG. 5 is a flowchart illustrating the steps performed on morpho-lexical data to generate a replacement string in an exemplary embodiment of the present invention. FIG. 6 provides a pictorial example of detecting a typographical error and generating a replacement in accordance with an embodiment of the present invention. FIG. 7 is a flow chart illustrating a process of detecting a typographical error in accordance with an exemplary embodiment. FIG. 8 is a flow chart illustrating a process of generating a replacement string in response to detecting typographical error.

INTERACTION BETWEEN THE PRIMARY PROGRAM MODULES

FIGS. 2 and 3 illustrate the primary program modules employed in an exemplary embodiment of the present invention and the interaction between these program modules. FIG. 2 is a block diagram illustrating the program modules, which include a word processing application program 36, a typographical error checking component 37, and a word breaking component 202. The exemplary embodiment provides a Japanese style checker for use with a word processing application program.

The word processing application program 36 is used to manipulate text, including Japanese text. The typographical error checking component 37, also described as a checking component, and the word breaking component 202 operate in tandem to perform style checking and to rewrite Japanese text provided by the word processing application program 36. The word breaking component 202 can analyze a Japanese sentence and provides morpho-lexical data that describes the phrase structure of each phrase in the analysis of the input sentence. The morpho-lexical data typically includes the phrase's constituent words and morphemes and bits that reflect certain attributes of each of these constituent in the phrase. The checking component 37 can apply critiques to the morpho-lexical data in a set of phrases in order to detect malformed phrases and generates replacement strings of the Japanese text.

In an exemplary embodiment, the checking component 37 and the word breaking component 38 are implemented as dynamic link libraries (DLL). A DLL is an executable routine, stored as an independent file, that can be loaded on an as-needed basis and called by other program modules. An application program can employ a DLL to perform a specific function, thereby eliminating the need for the application program to provide the function itself. In most cases, the application program and DLL will implement one or more application programming interfaces (APIs), which are used to allow one program module to call a function implemented by another program module, and to pass data between program modules.

FIG. 3 is a flowchart illustrating an exemplary method 300 for employing the program modules of FIG. 2 to perform Japanese typographical checking and rewrite generation. The method 300 begins at step 305 when Japanese text is typed into a word processing document or a document containing Japanese text is opened by the word processing application program 36 (FIG. 2). At step 310, the word processing application program 36 recognizes the presence of Japanese text and, at step 315, loads the checking component 37 and word breaking component 202, which are implemented as DLLs.

At step 320, the word processing application program 36 calls a function implemented by the checking component 37 and passing the input text to the checking component in step 325. The checking component 37 identifies a sentence in step 325 by passing the input text the word breaking component 202. In this embodiment, the checking component 37 then calls a function implemented by the word breaking component 202 and passes the text to the word breaking component as shown in step 330. At step 335, the word breaking component 202 analyzes the Japanese sentence and returns the resulting phrase analyses of the sentence to the checking component 37. The phrase analyses contains morpho-lexical data associated with each phrase. This morpho-lexical data describes the morpheme and word (lexical) constituents of the phrase as well as features of the morphemes and words stored in the dictionary. Features are represented as attribute-value pairs. For example, in a phrase containing a verb the attribute "Past-tense" may have a value of TRUE if the conjugation is in the past tense. This information is obtained during the morphological analysis of the verb phrase.

At step 340, the checking component 37 analyzes the morpho-lexical data to determine whether a typographical error exists. At step 345, the checking component 37 generates replacement text strings in the event that a typographical error exists.

At step 350, the checking component returns error information to the word processing application program 36. At step 355, the word processing application program 36 displays the error information and/or replacement strings in a suitable manner.

The present invention operates primarily in the context of analyzing the morpho-lexical data (step 340) and performing certain actions associated with this analysis (step 345). These steps will be described more completely below. The word breaking component 202, which analyzes a sentence and provides the morpho-lexical data, may be implemented in the manner described in copending U.S. patent application Ser. No. 08/672,638 entitled "*Identification of Words in Japanese Text by a Computer System*", filed 6/28/96 and assigned to Microsoft Corporation. The disclosure of this copending application is incorporated herein by reference.

MORPHO-LEXICAL DATA

The data provided by the word breaking component 202 (FIG. 2) is referred to as morpho-lexical data. "Morphology" refers to the description of word formation in a language. "Lexical" refers to the description of a word sense in a dictionary, including any features specific to it. The term "morpheme" refers to an indivisible linguistic unit that contains no smaller, meaningful parts. A "stem" is a morpheme that has meaning. The words stored in the dictionary are stems. A "bound morpheme" has no meaning and therefore cannot stand alone in a phrase, but must accompany a stem. Bound morphemes attach feature information to stems, such as number tense, etc. Prefixes and postfixes are examples of bound morphemes.

FIG. 4 illustrates a representative example of a Japanese sentence and the steps completed to create the morpho-lexical data that results from an analysis of the sentence. In this example, the input sentence 405 may be translated to "I will make the arrangements of tomorrow's meeting". Given the input sentence, the word breaking component 202 analyzes the characters in the sentence and assigns a probability score 415 that the edge between any two characters is a break in between a word (or phrase). This probability score 415 for each edge is shown under the Japanese characters 410. In this example, the probability scores 415 are the logarithm of an inverse probability and, therefore, the lower the score, the higher the probability that an edge exists between the two characters.

After the word breaking component 202 analyzes the characters and determines a probability score for each of the edges between the characters, it proceeds to sort the character pairs in ascending order of their edges' along with their probability scores, as shown in 420. Using the sorted characters, the word breaking component 202 then selects a character pair having an edge with the lowest probability score. Using the left character in this character pair, the word breaking component 202 will then try to create a valid phrase analysis 425 by using the characters from the input string to the left of the left character in the character pair. It is preferable that the analysis of finding a valid phrase analysis is completed by searching for a valid suffix, stem and then prefix, in that order.

After a valid phrase analysis 425 has been determined, the word breaking component 22 also associates a cost 430 with the phrase analysis. This associated cost 430 is a value of the likelihood that the valid phrase found is the correct phrase for the input sentence. The associated cost 430 is computed as an aggregate of the associated costs and inverse probability logs for each of the suffix, stem, and prefix constituents of the phrase analysis. An example of an associated probability is "C/IPL", which is cost/inverse probability log. Many sentences can have words that are not intended to be part of the sentence. For example, in the sentence "Haveaniceday" (note: the spaces have been taken out to analogize the Japanese style of writing), the word "nice" can be found as well as "ice". Because of the structure of the sentence, the word "nice" will have an associated cost that represents a higher probability of being a valid phrase in the sentence then "ice".

Not all characters will be part of a valid phrase. In the example of FIG. 4, there are characters that do not compose a valid phrase. Characters 435 contain a typographical error in the second Japanese character (an 'u' was typed in place of an'i') and consequently no valid Japanese word exists using the formation of these characters (created from the keyboard input: asutano, which can be translated with the typo as tomorriw's). These characters that cannot be formed into a valid Japanese word are referred to as a "hole".

Significantly, the word breaking component 202 does not perform any action on the holes in a sentence. Instead, the word breaking component 202 parses the sentence into as many possible words that can be made out of the sentence. For example, in the "Haveaniceday" example above, the word breaking component 202 will include as valid phrases "a", "an", "nice" and "ice" even though all of them cannot exist simultaneously in the sentence. The particular combination of words affects the size or even the existence of any hole in a sentence. An exemplary embodiment of the present invention utilizes the results of the word breaking component 202 to determine whether a typographical error exists and, in the event an error exists, generates a replacement string.

USING MORPHO-LEXICAL DATA TO DETERMINE THE EXISTENCE OF A TYPOGRAPHICAL ERROR AND GENERATE A REPLACEMENT

An exemplary embodiment uses data from morpho-lexical analysis (e.g., the word breaking component), to determine whether a typographical error exists in a Japanese sentence and to generate a replacement in the instance where one does exist. Referring now to FIG. 5, the method 500 begins at the Start step 505, where the word breaking component 202 has performed the analysis of the Japanese sentence and has broken it up into valid phrases and associated costs with each phrase.

At step 510, the words and associated costs are received from the word breaking component 202. Proceeding to step 515, the nonoverlapping phrases and their respective associated costs are combined to create phrase lists. Using the list of phrase analyses from the word breaking component 202, there will be multiple combinations and, consequently, multiple phrase lists. The goal of combining the words is to create a phrase list that spans the Japanese sentence by using valid phrases that are parsed from the sentence. If the sentence is capable of being completely spanned, i.e., it contains no "holes", then the phrase list is considered to have spanned the sentence. If the phrase list does not span the sentence, then the possibility for a typographical error exists. However, the existence of a hole does not support an assumption of the presence of a typographical error because the hole could be part of a less common word that is not contained in the standard dictionary used in checking for valid phrases. In addition, the hole may be a proper noun which doesn't exist in the dictionary. A proper noun, while not generally considered a valid stem of a valid phrase, is not viewed as a typographical error.

Step 515 preferably combines phrases that use nonoverlapping characters parsed from the input sentence by the word breaking component 202. An overlapping character is one or more characters shared by more than one phrase. In the "Haveaniceday" example, the words "an" and "nice" have an overlapping character "n". Phrases containing non-overlapping characters are used because the goal of combining phrases is to create an analysis that exactly spans the input sentence. If phrase lists contain phrases with an overlapping character, then combining those overlapping words together will never yield an exact match of the input sentence.

Step 515 typically results in many phrase combinations. In those cases where a spanning combination is not found, only those combinations which yield the lowest combined cost are used in further analysis to achieve maximum efficiency. The combinations having the lowest combined cost will be those combinations that are most representative of the input sentence. Therefore, selecting the combinations with the lowest combined cost will help maximize the efficiency of the algorithm by not wasting time analyzing combinations that have little or no chance of being the most representative of the input sentence.

At step 520, each hole located as the nonspanning combination is analyzed to determine if the hole is, in fact, a typographical error. As stated, a hole is not necessarily a typographical error because the term may be maintained in a more extended dictionary than is used by the word breaking component to determine whether it is a valid phrase. For example, the term may be a proper noun or an archaic spelling of a word. The hole analysis is discussed in more detail below with FIG. 7.

In step 525, a replacement string is generated for those holes that contain a typographical error. The replacement string is generated by applying a set of heuristics (rules) and finite-state morphology. If the heuristics fail to find a replacement string, then the finite-state morphology will generate a valid replacement string for the typographical error. The generation of the replacement string is discussed in more detail with FIG. 8.

AN EXAMPLE OF TYPOGRAPHICAL DETECTION AND REPLACEMENT

FIG. 6 illustrates the steps involved in performing typographical detection and replacement in an exemplary embodiment of the present invention. Because of the complexity of the Japanese language, for simplicity, English text will be used in FIG. 6 to support a review of a representative example. The example uses the sentence "Haveanicday" 605 as the input sentence. Similar to Japanese text, there are no spaces between the words in this representative input sentence. The input sentence also contains an error, specifically, "nic" should be spelled "nice".

The word breaking component 202 receives the input sentence and parses the sentence to find phrases contained within the sentence. The output of the word breaking component is morpho-lexical data 610, which includes a list of phrases and their associated costs. The word breaking component 202 preferably finds all possible words contained in the sentence. For this example, the word breaking component 202 identifies "Have", "a", "an" and "day" as valid phrases in the input sentence.

The individual valid phrases and their associated costs are then combined in an effort to rebuild the input sentence and to determine if any characters in the input sentence are not represented by any valid phrases. The associated cost numbers shown in the morpho-lexical data 610 are exemplary only and do not imply that these are the only associated costs that can be associated with their respective valid phrase analyses.

A Phrase Lists 615 is generated to store the combined phrases and the combined costs. Each combined cost is a value that signifies how well-formed the phrase list is given the input sentence. Preferably, the combined cost factors in more than the mere number of characters that are represented, but also incorporates the structure of the sentence, and other rules of morphology, word-formation, compounding and syntax so that the associated cost is a more accurate measure to use as a comparison. For example, using English, it would be preferable that the combined cost incorporate parts of speech and other grammatical rules so that the probability figure is a better gauge of how accurate the combined words represent the input sentence.

After developing the Phrase Lists 615, the best phrase list is selected based on which combined cost has the lowest cost signifying that it is most representative of the input sentence. In this example, the combined valid phrase list selected is "Haveaday". Note that the selected phrase list does not include the characters "nic". These characters represent a hole, i.e., characters in the input sentence but not in the selected phrase.

Using the characters that compose the hole (i.e., "nic"), the characters making up valid stems in an extended dictionary 620 are checked for a possible match. This extended dictionary 620 is more exhaustive than the standard dictionary that is used by the word breaking component 202 to create the valid phrase analyses.

If a phrase analysis cannot be created with the hole characters by accessing stems in the extended dictionary, an inquiry is conducted to determine if the holes' characters are a proper noun 625. The purpose of this inquiry is to catch names that are not contained in any dictionary, yet are not typographical errors either.

After checking the hole characters to see whether they match a proper name, an expansion function 630 is performed to add another character to the hole. The expansion function adds a character to the hole and rechecks to determine if the hole is either contained in the extended dictionary 620 or is identified as a proper noun 625. The expansion is preferably performed by adding a character to the left of the hole and then to the right of the hole, back and forth, one at a time until the next word on both sides of the hole is reached. In the example in FIG. 6, the hole "nic" is first expanded to "anic" by adding one character to the left. After the character is added, the characters "anic" are then rechecked to see if they are in the extended dictionary 620 or a proper noun 625. If "anic" is not found, then these characters are expanded again, this time by adding a character to the right, therefore creating the new expanded character set "anicd". Next, "anicd" is checked to determine if it is in the extended dictionary 620 or a proper noun 625. If "anicd" is not found, it is expanded yet again. However, this time, because a complete word to the left of the hole is reached (i.e., the "a" to the left of the hole "nic" is a complete word and has been incorporated into the expanded characters), the expansion is only performed on the side of the characters that have not been expanded. Therefore, the additional "a" and then "y" to the right of the characters "anicd" are in turn expanded on the initial set and, as with the other expanded characters, are checked in the extended dictionary or examined to determine if they are a proper noun.

If, at any point during the expansion, a phrase analysis is created using stems found in the extended dictionary or stems that can be identified as a proper noun, it is included as a valid phrase and is recombined with other valid phrases to see if it produces a higher combined cost than the current phrase list. However, after completing the expansion, if the hole characters (or any of the expansions on the hole) are not found to match a stem in the extended dictionary or identified as a proper noun, then the hole characters are used to generate a replacement string. In this case the hole characters "nic" are used to find a replacement string. Following the replacement algorithm, the characters "nice" are useful for generating a suggested replacement string. Generation of a replacement string is discussed in more detail below with respect to FIG. 8. After generating the replacement string, the replacement string "nice " 640 is then presented to the user as a suggested replacement to the string "nic".

A METHOD OF DETECTING A TYPOGRAPHICAL ERROR

FIG. 7 depicts a method 700 for detecting a typographical error in a sentence in accordance with an exemplary embodiment of the present invention. Method 700 supports an analysis of the hole characters to determine whether a typographical error exists. The method 700 begins at the start step 705. Following the start step 705, the combined nonoverlapping phrases and the combined costs (i.e., inverse probability logs (C/IPL)) are received in step 710. At this point, the input sentence has been parsed to determine the valid phrases that it contains. In addition, a set of phrase lists of combined phrases has been developed by combining the nonoverlapping valid phrase analyses in an attempt to create an exact spanning analysis of the input sentence. The combined costs of the combined phrases have also been calculated and associated with each of the phrase lists in the set of Phrase Lists.

At step 715, an inquiry is conducted to determine if any of the phrase lists are spanning. In order for a phrase list to be spanning, all of the characters in the input sentence are represented in the combined phrase analyses of the phrase list and no more. In essence, concatenating the characters in the phrase analyses making up the phrase list creates a string that looks exactly like the input sentence when the phrase list is spanning. If a combined phrase list is spanning, then the input sentence is made up of all valid phrases, and no typographical error is detected. Hence, in the case when a spanning phrase list is found, the Yes branch is followed from step 715 to step 745, and the method terminates.

In the event where there are no spanning phrase lists in the set of Phrase Lists, then the possibility exists that the input sentence contains a typographical error. This possibility exists because there are characters in the input sentence that are not contained in any valid phrase, as determined by the morpho-lexical analysis. However, it is not assured that a typographical error exists at this point and, therefore, further analysis is required. If the test at step 715 results in a determination that no spanning phrase list exists, then the No branch is followed to step 720.

At step 720, a hole is determined using the phrase list having the lowest cost from the set of Phrase Lists. The set of phrase lists typically contains many combined phrase lists that have been constructed to determine whether they match the input sentence. To determine whether a typographical error exists, it is preferable to use the list that has the lowest cost (or, highest probability) of representing the input sentence, to determine if the hole characters contain a typographical error. Selecting the lowest cost list increases the efficiency of the method 700, as well as providing a more accurate analysis of the input sentence when determining whether a typographical error exists.

The hole is determined in step 720 by using the characters contained in the phrase list with the lowest combined cost and removing them from the input sentence. Any characters remaining will be considered a "hole" in the combined phrase list. A typographical error, if any, exists in the hole within the input sentence. In addition, there may be several holes in the phrase list each containing a typographical error.

At step 725, an inquiry is conducted to determine if the hole represents a valid phrase analysis (or set of phrase analyses) with a word stem that exists in the extended dictionary. This can be performed by using a standard look-up method to determine whether a set of characters exists in a dictionary. Suffix analysis is performed first by the word breaking component 202 to constrain the set of characters that can form a word stem. The extended dictionary is used to increase the accuracy of the typographical detection. When the valid phrase analyses are determined in the morpho-lexical analysis, performance is increased when the size of the dictionary is decreased. If fewer valid words are defined in the dictionary, a more efficient inquiry can be completed to determine if a group of characters are in the dictionary. The drawback, however, is that fewer words defined in the dictionary increases the odds that a group of characters not defied in the dictionary represents a valid phrase analysis. It is an accuracy/performance trade-off that must be made in any dictionary look-up mechanism.

This exemplary embodiment increases the accuracy of typographical detection by overcoming the accuracy/performance trade-off issue of morpho-lexical analysis by looking up the hole in an extended dictionary. Performance is not significantly affected when the extended dictionary is used because only the holes are examined rather than all phrases in the input sentence. Thus, accuracy is improved without hindering the performance of the morpho-lexical analysis.

At step 730, the hole is analyzed to determine if it is a proper noun. Proper nouns are often used in documents, but few proper nouns are considered "valid" words. Proper nouns are not contained in most dictionaries. Determining whether the hole is a proper noun increases accuracy when determining whether a typographical error exists.

It will be recognized by one skilled in the art that checking an extended dictionary and conducting a proper noun search can increase the accuracy of the typographical detection; however, these steps are not required if performance becomes an issue. While these steps increase accuracy with only a minimal impact on performance, those skilled in the art will appreciate that these steps may be omitted if even the minimal effect on performance is too great (with the caveat that the accuracy of the typographical detection may be reduced).

If the hole is not found in the extended dictionary or the hole is not identified as a proper noun, then it is preferable to expand the hole prior to searching the extended dictionary again and conducting the proper noun search. This "relaxing" of the hole search is found to increase the accuracy of the typographical detection.

At step 735, a cost is calculated to determine whether the hole is a typographical error based on the extended dictionary and proper noun search. If the hole is not found in the extended dictionary and proper noun search, it is preferred that the cost for the hole is calculated to be the maximum cost (e.g. 2048) minus the length of the hole.

At step 740, if the cost of the hole is greater than a predefined threshold, then a replacement string for the hole is generated. Because of the performance/accuracy trade-off, it is preferable to avoid generating a replacement string for every hole that is not in the extended dictionary or is not identified as a proper noun. Generating a replacement string for every hole may result in over-flagging words that are not considered typographical errors. To prevent this over-flagging, a threshold can be defined so that only those holes that have not been accounted for at this step (i.e., not in the extended dictionary or not a proper noun) and have the highest probability of being a typographical error cause a replacement string generation. Setting this threshold is based on many factors, which include: 1) the accuracy of the morpho-lexical analysis; 2) the thoroughness of the extended dictionary; 3) whether an extended dictionary search is performed and 4) whether the proper noun analysis is performed.

The method 700 terminates at step 745.

GENERATING A REPLACEMENT STRING

FIG. 8 depicts a method 800 for generating a replacement string for a string of characters containing a typographical error. In the following explanation, a distinction is made between a typographical error and a text entry error. A typographical error is the sequence of malformed text discovered by the above described method. A text entry error is the sequence of mistakes which create a typographical error. Thus a typographical error "helllo" would have been created by the text entry error of pressing the 1-key once more than was intended. In order to generate an appropriate replacement string for a typographical error, it is necessary to infer what text entry error has occurred and correct it. The method 800 begins with the start step 805. Proceeding to step 810, the characters containing the typographical error are received.

At step 815, reverse transformations are applied to the hole to determine if a replacement string is available. A reverse transformation corrects an individual text entry error; thus an error which consists of duplicating a character would be corrected by a transformation which deletes a character when it is preceded by another instance of itself. A reverse transformation consists of three elements: the action (insertion, deletion, transposition, substitution), the environment (sequence of characters) in which it applies, and the cost of applying the transformation. The cost approximates the probability that the typographical error was indeed the result of the presumed text entry error; thus transformations which correct impossible sequences of characters have low costs, while those which replace merely improbable sequences have higher costs. The hole is scanned for patterns which match reverse transformations, and each transformation which matches is applied. All replacement candidates generated in this fashion and the costs associated with the transformations that generated them are stored in a data structure called a trie.

An example of these transformations is as follows in Table I:

TABLE I

2: を —> 0/を _

This transformation attempts to instances of duplicated character by replacing a duplicate occurrence with a single one. This is a relatively high precision transformation as valid Japanese text will almost never have two characters in a row.

An example of a transformation which adds characters is shown in Table II:

TABLE II

5:0 —> た/かっ

This example looks for a missing syllable at the end of the past tense marker for adjectives. Since other characters can follow "かっ"in well-formed text, this transformation is less precise than the one Table I, and thus has a higher cost.

Proceeding to step 820, once all the transformations which match the hole have been performed, the resulting replacement candidates are ranked. All the candidates whose total cost is less than a maximum value are analyzed by the analysis component of the invention to determine their probability of occurrence (or well-formedness). Candidates which include holes are discarded immediately. Each candidate's probability is then combined with its cost to create its score. The candidates are then ranked by score, and those with scores that are worse than a threshold value are discarded. The candidate with the best score is presented as the best replacement string.

At step 825, the replacement string is presented to the user as a suggested replacement. It will be recognized by one skilled in the art that several replacement strings may be generated and shown to the user. In addition, these replacement strings may be prioritized so that the display presents the replacement string calculated to be the most probable replacement at the top of a list (or highlighted), with less probable replacement strings shown in a descending order or in a subordinate position. The method 800 terminates at step 830.

From the foregoing description, it will be appreciated that the present invention provides an improved method for detecting typographical errors and generating replacement strings in documents containing Japanese text. The present invention minimizes the time required to generates a replacement text string while increasing accuracy by minimizing the over-flagging of correct words and under-flagging of typographical errors.

The embodiments described above employ probabilities, dictionaries and heuristics in a bottom-up approach to words that are found in morpho-lexical information derived from the Japanese text. The bottom-up approach combines valid words into well-formed combined words, i.e., phrases, to determine the existence of "holes". Holes are characters contained in the input sentence but not in well-formed phrases. Probabilities are used to determine which phrase is most representative of the input sentence. The hole contained in the phrase list having the lowest cost is analyzed to determine if it is a typographical error. This analysis includes examining the hole to determine if it is contained in an extended dictionary and conducting an inquiry to determine whether the hole represents a proper noun. If the hole is identified as a typographical error, a replacement string is generated using reverse transformations which model the process by which the error was created. Probabilities, finite state morphology, and a dictionary are used in the replacement string generation process to determine the valid words.

The invention may be implemented in one or more program modules that are based upon and implement the processes and features illustrated in FIGS. 2, 3, and 5–8. No particular programming language has been described for carrying out the various processes described above because it is considered that the operations, steps, and procedures described above and illustrated in the accompanying drawings are sufficiently disclosed to permit one of ordinary skill in the art to practice the present invention. Moreover, there are many computers and operating systems that may be used in practicing the present invention and therefore no detailed computer program could be provided that would be applicable to all of these many different systems. Each user of a particular computer will be aware of the language and tools which are most useful for that user's needs and purposes.

In addition, although the invention was described in the context of processing Japanese sentences, those skilled in the art will appreciate that the present invention may be applied to other languages and to other groupings of text. Similarly, although the foregoing example addressed the problem of a typographical error missing a character, the present invention may be used on other typographical errors including duplicate, transposed, extra, and incorrect characters. Finally, those skilled in the art will appreciate that the foregoing description of the use of dictionary look ups, heuristics, finite-state morphology and morpho-lexical data, does not preclude the use of other searching techniques'or other representations of word formations and text attributes.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A computer implemented method of finding a typographical error in a sentence, comprising the steps:

receiving phrases parsed from the sentence;

generating phrase lists by combining selected ones of the phrases that do not overlap;

determining a best one of the phrase lists by calculating a cost that each phrase is contained in the sentence and selecting the phrase having the lowest cost;

identifying a hole comprising characters contained in the sentence but not contained in the best phrase list; and determining whether the hole contains a typographical error.

2. The computer implemented method of claim 1, further comprising the step of generating a replacement string by applying reverse transformations in the event the hole contains a typographical error.

3. The computer implemented method of claim 1, wherein each of the phrase lists is assigned an associated cost comprising a probability that the phrase list is a valid nonoverlapping phrase list in the sentence.

4. The computer implemented method of claim 1, wherein each one of the phrase lists is assigned a combined probability, wherein the combined probability is calculated by using the associated cost of each phrase analyses contained in each of the phrases within the phrase lists.

5. The computer implemented method of claim 4, wherein the step of determining the best phrase list is calculated by using the combined probability of each of the phrases.

6. The computer implemented method of claim 1, wherein the step of determining whether the hole has a typographical error comprises conducting an inquiry to determine if a valid phrase analysis can be created for the hole by matching characters with a stem entry in an extended dictionary.

7. The computer implemented method of claim 6, wherein the step of determining whether the hole has a typographical error comprises conducting an inquiry to determine if the hole represents a proper noun.

8. The computer implemented method of claim 1, wherein the sentence comprises characters of the Japanese language.

9. A computer readable medium having computer-executable instructions for performing the steps recited in claim 1.

10. A computer implemented method of finding a typographical error in a sentence containing characters, comprising the steps:
receiving phrases parsed from the sentence, wherein each of the phrases has an associated probability cost;
generating phrase lists by combining selected ones of the phrases that fail to overlap with other phrases of the sentence;
calculating a combined probability for each of the phrase lists by combining the associated cost of each of the selected phrases;
determining a best one of the phrase lists by selecting one of the phrase lists having the highest combined probability;
identifying a hole comprising characters contained in the sentence but not contained in the best phrase list; and
determining whether the hole contains a typographical error.

11. The computer implemented method of claim 10, wherein the step of determining whether the hole has a typographical error comprises conducting an inquiry to determine if the hole matches a phrase analysis containing a stem in an extended dictionary.

12. The computer implemented method of claim 11, wherein the step of determining whether the hole has a typographical error comprises conducting an inquiry to determine if the hole represents a proper noun.

13. The computer implemented method of claim 12, further comprising the step of calculating the probability a typographical error is contained in the hole by subtracting the length of the hole from a predetermined number.

14. The computer implemented method of claim 11, further comprising the step of generating a replacement string by applying reverse transformations in the event the hole contains a typographical error.

15. The computer implemented method of claim 14, wherein generating the replacement string comprises performing edit operations for modifying the hole to a word, wherein the edit operations comprise deleting a character, inserting a character and transposing a character.

16. A computer readable medium having computer-executable instructions for performing the steps recited in claim 10.

17. A computer implemented method of finding a typographical error in a sentence comprising Japanese characters, comprising the steps:
receiving a Japanese input sentence containing a typographical error;
parsing the Japanese input sentence into a plurality of phrases and calculating a Cost/Inverse Probability Logarithm probability (C/IPL), representing an inverse probability that the words are at least a portion of the Japanese Input sentence, for each of the words;
generating a plurality of phrase lists by combining selected ones of the phrases that are non-overlapping, and calculating a C/IPL for each of the phrase lists;
determining a best one of the phrase lists by selecting one of the phrases having the lowest C/IPL value;
identifying a hole by comparing the best phrase list with the Japanese input sentence and identifying certain characters contained in the Japanese input sentence that are not included in the best phrase list;
calculating a C/IPL for the hole; and
identifying a typographical error by determining whether the C/IPL of the hole exceeds a predetermined threshold.

18. The computer implemented method of claim 17, further comprising the step of generating a replacement string by applying reverse transformations in the event the hole contains a typographical error.

19. The computer implemented method of claim 18, wherein the step of generating a replacement string comprises the steps:
applying a reverse transformation on the hole to determine candidate replacement strings;
ranking the replacement strings according to the probability associated with a resultant phrase or set of phases and a cost associated with the reverse transformation; and
selecting the replacement string having the highest ranking.

20. A computer implemented method of generating a replacement string as a correction form of a character string containing a typographical error, comprising the steps of:
receiving a character string containing the typographical error;
examining the character string for patterns that match a reverse transformation;
for each match, applying a reverse transformation on the character string to generate a possible replacement string;
ranking each of the possible replacement strings according to the probability associated with an occurrence of each of the possible replacement strings and a cost associated with applying the reverse transformation, the cost generally increasing or decreasing as the probability of occurrence of the characters in the character string that are changed by the reverse transformation or decreases; and
selecting as a replacement string the possible replacement string having the highest ranking.

21. The computer implemented method of claim 20, wherein the character string and the replacement string comprise Japanese characters.

22. A computer implemented method of presenting a replacement Japanese string for a Japanese string containing a typographical error, comprising the steps of:
inputting the Japanese string containing the typographical error;
receiving phrases parsed from the Japanese string;
generating phrase lists by combining selected ones of the phrases that do not overlap;
determining a best one of the phrase lists by calculating a probability that each phrase list is contained in the Japanese string and selecting the phrase list having the highest probability;
identifying certain characters contained in the Japanese string but not contained in the best phrase list;
generating the replacement string by applying reverse transformations in the event the certain characters represent a typographical error; and
presenting the replacement string to the user as the Japanese string replacement.

* * * * *

UNITED STATES PATENT AND TRADEMARK OFFICE
CERTIFICATE OF CORRECTION

PATENT NO. : 6,401,060 B1
DATED : June 4, 2002
INVENTOR(S) : Critchlow et al.

It is certified that error appears in the above-identified patent and that said Letters Patent is hereby corrected as shown below:

Column 7,
Line 12, replace "38" with -- 202 --.

Column 8,
Line 55, replace "22" with -- 202 --.

Column 13,
Line 23, replace "defied" with -- defined --.

Column 18,
Line 39, after "mation" insert -- increases --.

Signed and Sealed this

Twenty-fourth Day of December, 2002

JAMES E. ROGAN
*Director of the United States Patent and Trademark Office*